United States Patent [19]

Mass

[11] Patent Number: 5,151,252
[45] Date of Patent: Sep. 29, 1992

[54] CHAMBER DESIGN AND LAMP CONFIGURATION FOR AN ULTRAVIOLET PHOTOCHEMICAL REACTOR

[75] Inventor: Barton Mass, San Jose, Calif.

[73] Assignee: Purus, Inc., San Jose, Calif.

[21] Appl. No.: 778,651

[22] Filed: Oct. 17, 1991

[51] Int. Cl.⁵ .............................................. B01J 19/12
[52] U.S. Cl. .................................. 422/186.3; 422/24
[58] Field of Search ...................... 422/186.21, 186.04, 422/186.3, 186, 24

[56] References Cited

U.S. PATENT DOCUMENTS 3,920,547  11/1975  Garrison et al. ...................... 210/63
4,892,712  1/1990  Robertson et al. .................. 422/186

OTHER PUBLICATIONS

"Experimental Rate Constants and Reactor Considerations for the Destruction of Micropollutants and Trihalomethane Precursors by Ozone with Ultraviolet Radiation", H. William Prengle, Jr., *Environ. Sci. Technol.*, (1983), 17:743-747.

"Photochemical Processing: Photodecomposition of Pollutants in Water", J. M. Smith et al., *Chemical Engineering Education*, Winter 1971, pp. 18-22 & 36.

"Batch, Recycle Reactor for Slow Photochemical Reactions", A. E. Cassano et al., *I & EC Fundamental*, 7:655-660 (1968).

"Photochlorination of Propane", A. E. Cassano et al., *A. I. Ch. E. Journal*, 13(5):915-925.

"Photochlorination in a Tubular Reactor", A. E. Cassano et al., *A. I. Ch. E. Journal*, 12(6):1124-1133 (1966).

Primary Examiner—Brooks H. Hunt
Assistant Examiner—Daniel J. Jenkins
Attorney, Agent, or Firm—Cooley Godward Castro Huddleson & Tatum

[57] ABSTRACT

A reactor for the treatment of a fluid with a substantially uniform dosage of light from a line-type light source, which comprises:
- a reactor housing forming an internal space comprising a fluid entry region, a fluid exit region,
- a central photochemical treatment region comprising a housing, a means for circumferentially distributing fluid flow radially towards and perpendicular to a line-type light source, and a fluid exit region, wherein the central photochemical treatment of the housing is rotationally symmetrical about a central axis and
- one or more line-type light sources mounted in the treatment region substantially at the central axis of the housing, the axis of the lamps being oriented parallel to the rotational axis of the treatment region housing.

Methods are also provided using the circumferential distribution of fluid flow radially toward and perpendicular to the line-type light source.

25 Claims, 4 Drawing Sheets

CHAMBER DESIGN AND LAMP CONFIGURATION FOR AN ULTRAVIOLET PHOTOCHEMICAL REACTOR

INTRODUCTION

1. Technical Field

The present invention relates to a reactor for use in irradiating fluid materials with UV light for the purpose of carrying out photochemical reactions in the fluid material and a method for conducting photochemical reactions using the reactor.

2. Background

Flash lamps, which are generally filled with xenon or krypton, produce intense pulses of light when subjected to an increase in voltage from below to above the voltage required to generate an arc through the lamp. The lamps are not operated in a continuous fashion, but, as indicated by their name, in a flashing mode by applying pulsed voltage to the lamps. The lamps are generally linear in shape (as is the arc).

In order to use a flash ultraviolet (UV) lamp as the source of deep UV radiation for carrying out photochemical reactions in fluids (either for photochemical synthesis or degradation), a fluid treatment chamber should be designed which will make optimum use of the light generated by the lamp. The lamp is a compact, high brightness UV source that does not radiate uniformly in all directions because of the shape of the arc and the lamp. At the same time, cost effective implementation of this source requires near quantitative absorption of the photons generated into the fluid medium to be treated. Accordingly, there is a need for improved UV reaction chambers that will more effectively utilize the radiation from flash U lamps.

Relevant Literature

U.S. Pat. No. 4,892,712 discloses a tubular reactor of essentially uniform diameter for use in fluid purification containing a matrix having surfaces with which a fixed anatase ($TiO_2$) material or other photoreactive semiconductor material is bonded. U.S. Pat. No. 4,897,246 discloses a tubular reactor including a lamp seal that accommodates the expansion of an ultraviolet lamp and has a specially designed interchangeable family of baffles and distributors to accommodate a wide range of flow rates by replacing one set of baffles and distributors by a different set. U.S. Pat. No. 3,920,547 discloses a reactor for destroying cyanides which comprises a plurality of separated contact zones wherein an aqueous cyanide solution is contacted in countercurrent or parallel flow with an ozone containing gas. Other reactors are described in Smith, J.M., *Chemical Engineering Education*, (1971) 161:18-36; Cassano *et al.*, I & EC Fundamentals (1968) 7:655-660; Cassano *et al.*, *A. I. Ch. E. Journal* (1967) 13(5):915-925; Cassano *et al.*, *A. I. Ch. E. Journal* (1966) 12(6):1124-1133 and *I & E. Chemistry* (1967) 59:18-88.

SUMMARY OF THE INVENTION

The present invention relates to a reactor for treatment of a fluid with a line type light source which comprises:

a reactor housing forming an internal space comprising at least one fluid entry region, at least one fluid exit region, and a central photochemical treatment region comprising a housing, a means for circumferentially distributing fluid flow radially toward and perpendicular to a line-type light source and at least one fluid exit region being located on said central axis, wherein the central photochemical treatment region is rotationally symmetrical about a central axis.

The means for circumferentially distributing the fluid flow radially toward and perpendicular to a line-type light source can be any means which provides for a circumferential uniform flow toward the length of the line-type light source and can include a baffle plate, a treatment region housing itself, a pheripheral entry region, preferably a circular porous means, such as a screen or the like. Optionally, if the baffle plate is not the primary means of circumferentially distributing fluid toward the line-type light source, one or more baffle plates, usually circular in shape, are located between the entry region and the light source in the treatment region. Variations in the configuration and use of the fluid entry means of the treatment region and or treatment region housing, optionally with the baffles, to cause the circumferential distribution of fluid to flow radially toward and perpendicular to the the length of the light source in the treatment region are discussed in detail below.

One or more line light sources, such as UV lamps (also referred to herein as UV arc sources or UV lamps) are mounted in the treatment region substantially at the center axis of the housing, the arc of the lamps being oriented parallel to the rotational axis of the housing and the housing of the lamps sealed in fluid tight relationship to prevent incoming fluids from mingling with exiting treated fluids.

The housing of the reactor and the photochemical treatment region can be the same housing or may be two different housings. Likewise, the fluid exit regions of the reactor housing and the treatment region can be the same but are usually two different regions. The fluid entry region of the reactor and of the treatment region are usually different because there is usually a change from pipeline fluid flow to a broader flow at the treatment entry region.

The invention also is directed to a method for treatment of a fluid with a line-type light source which comprises:

injecting a fluid into a reactor comprising a reactor housing forming an internal space comprising at least one fluid entry region, at least one fluid exit region, a central photochemical treatment region comprising a housing, a means for circumferentially distributing fluid flow radially toward and perpendicular to a line-type light source and at least one fluid exit region located on said central axis, wherein the central photochemical treatment region is rotationally symmetrical about a central axis, and at least one line-type light source as described above, and removing said treated fluid through said fluid exit in said treatment region and reactor housings.

The variations in the method are the same as those discussed for the apparatus. For example, optionally one or more baffle plates, usually circular in shape, are located between the entry region and the light source in the treatment region. The housing and the fluid entry region, optionally with the baffles, are adapted to cause the fluid to flow radially toward the center of the treatment region and perpendicular to the line-type light source.

DESCRIPTION OF SPECIFIC EMBODIMENTS

Figure 1:
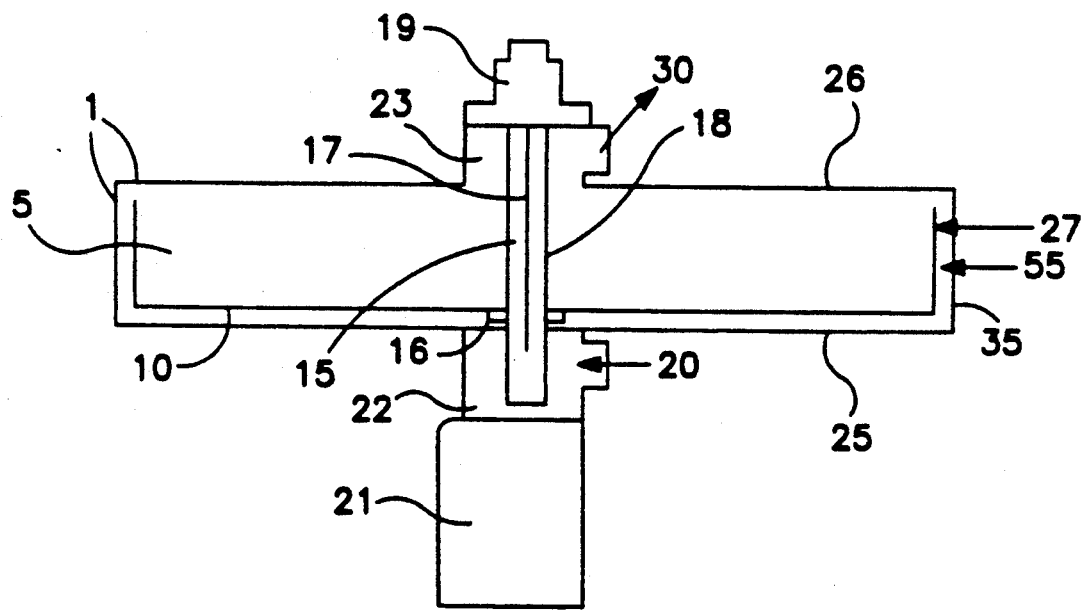
FIG. 1 is a drawing of a cross-sectional side view through the central axis of a UV radiation treatment reactor of the invention.

The invention will now be described in detail with reference to the accompanying Figures, beginning with FIG. 1, in which the same reference numerals are used in all Figures for the same parts of the apparatus.

In one embodiment, the present invention is directed to a reactor for the treatment of a fluid with a substantially uniform dosage of UV light which comprises a reactor housing forming an internal space comprising at least one fluid entry region and at least one fliud exit region at one end of the space, a central photochemical treatment region comprising a housing, a means for distributing fliud flow radially toward a line-type light source and a fluid exit region located on said central axis, wherein the central photochemical treatment region of the housing is rotationally symmetrical about a central axis. Preferably each end of the reactor and treatment region housings (i.e., the fluid entry and exit regions) is or are substantially narrower than the central photochemical treatment region housing.

As discussed above, a means for circumferentially distributing fluid radially toward and perpendicular to a line-type light source can be any means which provides for a circumferential uniform radial flow toward and perpendicular to the length of the line-type light source and can include a pheripheral fluid entry means, a baffle plate, a screen, a porous wall, a treatment region housing or the like or combinations thereof. For example, a baffle plate, usually circular in shape, is located between the entry region and the treatment region. The housing and baffle are adapted to cause the fluid to flow around the edges of the baffle plate toward the center of the treatment region. One or more UV light sources ( also referred to herein as UV arc sources or UV lamps) are mounted in the treatment region substantially at the center axis of the housing, the arc of the lamps being oriented parallel to the rotational axis of the housing and the housing of the lamps sealed in fluid tight relationship to the baffle plate at the end of the arc region. The outer enclosure or dome of the lamp may be sealed to the baffle plates. For example, a lamp wiper assembly can provide the seal. The length(height) of the treatment region at the center of the housing can vary up to about twice the length of the arc of the light source. Preferably, the length of the treatment region is substantially equal to the length of the arc of the lamps. The UV light sources or lamps can include any of the known UV lamps, such as flash, mercury vapor, arc, excimer discharge and the like. Preferably, the lamps are flash lamps.

A reactor for the treatment of a fluid with a substantially uniform dosage of UV light comprises a reactor housing (1) forming an internal space comprising a fluid entry region (20) at one end of the housing, a central photochemical treatment region (5), and a fluid exit region (30) at the opposite end of the rector housing.

The reactor housing is rotationally symmetrical about a central axis (i.e, cylindrical), at least in the central photochemical treatment region (and preferably throughout the apparatus). Some variation in rotational symmetry can occur, for example to allow for attachment of various components to each other or for ease of manufacturing. However, preferred embodiments are completely cylindrical in the photochemical treatment region to allow maximum utilization of light. Each end of the housing in preferred embodiments is substantially narrower in diameter than the central region thereof in order to avoid unnecessary volume of the apparatus. However, the shape of the entry region is a relatively minor factor in the practice of the invention. On the other hand, the exit region needs to have a smaller diameter than the treatment region so that fluid will flow radially inward in the treatment region (i.e., toward the exit region). In the embodiment shown in FIG. 1, the treatment region (5) comprises the central region of the housing, although other embodiments can have the treatment region in different relative locations. For example, the entry region can comprise a fitting for attachment of a housing consisting essentially of the treatment and exit regions onto a larger waste container so that waste fluid to be treated simply enters the treatment region around the baffle (which is discussed below).

The fluid entry region (20) of the reactor housing is normally located centrally at one end of the reactor housing. As used here, the phrase "entry region or pheripheral entry region (55)" refers to the region in the apparatus through which fluid flows immediately before entering the treatment region, whether or not this is the actual point of entry of fluid into the apparatus. Fluid can enter the fluid entry region via one or more connections to sources of the fluid being treated.

Fluid is introduced into the treatment region through the pheripheral entry region (55) under sufficient pressure to cause fluid flow through the apparatus, with the flow rate being adjusted as desired to provide any desired residence time for fluid in the treatment region.

A baffle plate (10), usually circular in shape, can be located between the fluid entry region of the reactor (20) and the treatment region to form the means for distributing fluid flow radially toward the light source. In the embodiment shown in FIG. 1, the baffle is spaced from and substantially parallel to the lower end (25) of the treatment region and is of smaller diameter than the housing, the baffle plate and housing together being adapted to cause the fluid to flow radially outward towards the outside walls (35) of the housing and around the edges of the baffle plate toward the center of the treatment region where the arc source is located. The baffle plate (10) is attached to the housing, for example, by being suspended from the top (in the orientation shown in FIG. 1) of the treatment region by a series of spacers (not shown) connecting the top end (26) of the treatment region and the baffle plate (10).

One or more UV flash lamps (15) is mounted in the treatment region so that the arc of the lamp will be located on the side of the baffle plate facing away from the entry region and substantially at the center axis of the housing, the arc or the lamp or lamps being oriented parallel to the central axis of the housing and substantially at the center of the treatment region. If a single lamp is used, the lamp arc (17) is preferably located directly on the central axis of the camber. If multiple lamps are used, the lamps are configured to give an effective optical center line located at the treatment region center line or axis. The length of the treatment region (5) is substantially equal to the length of the arc (or total arcs) of the central lamp (or lamps). If the housing (19) of the lamps is sufficiently long (as it usually is) so that engineering of the apparatus requires part of the housing to pass through the baffle in order to maintain equal lengths of arc and treatment region, the lamp outer enclosure or dome (18) may be sealed (16) in fluid tight relationship to the baffle plate. Any conventional sealing means (16) can be used to provide the fluid tight seal of the lamp to the baffle plate (for example a commercial lip seal). Alternatively, the sealing means can be incorporated into the lamp wiper brush mechanism.

The narrow fluid exit region of the reactor housing (30) is centrally located in the opposite end of the housing from the entry region (20) to remove treated fluid from the treatment region. As with the fluid entry region, "exit region" here refers to the region of the apparatus in which fluid exits the reactor housing and may be the same exit or a different exit than that of the treatment region. The use of a small, centrally located, fluid exit region in the apparatus (photochemical reactor) of the invention causes the fluid flowing around the baffle plate to flow radially inward toward the center of the treatment region where the UV lamps are located.

This flow of fluid to be treated radially toward the length of the UV lamps rather than away from or parallel to the lamps, when combined with the photochemical reaction taking place in the treatment region, results in a concentration gradient of photoreactant in the fluid to being treated (e.g. a contaminant being removed) that is higher toward the edges of the apparatus and lower in the central region near the lamps. There is also a light intensity gradient, with the higher light flux being located near the lamps and decreasing toward the edges of the apparatus. As, for example, a contaminated fluid flows toward the light, the contaminant concentration in the fluid being treated decreases as light increases and as the contaminant is removed by action of the light. In addition to normal decrease in light intensity with distance from the source, the light intensity also decreases as light is absorbed by the photochemical reactant (e.g., contaminant in waste water) in a defined manner. Accordingly, the diameter of the treatment region can be specified to conform with the light input power and light penetration depth desired for any given concentration of photoreactant or contaminant.

Although the treatment region shown in FIG. 1 is designed for an expected concentration of reactant in the fluid, a specific light intensity, and a normal flow rate, the operation of the apparatus can be carried out in a non-fixed mode for greater efficiency. For example, when using the reactor to decontaminate a waste flow stream that contains different amounts of contaminant at different times, the real reaction values yield a UV light penetration depth which is a function of the chemical composition of the material in the fluid being treated and the fluid flow rate at any instant of time. By adjusting the fluid flow rate and/or lamp output as a function of chemical composition of the fluid, the concentration gradient of a material in the fluid to be treated, e.g. a contaminant, can be made to conform to the treatment region dimensions and lamp input power and penetration depth. In such a calculation based upon a normalized concentration, the concentration of material in the fluid to be treated at the inlet is assumed to be unity and the concentration at any other point is expressed as a decimal fraction of the inlet concentration. When more than one lamp is used and the lamps are flashed simultaneously, the optical power in the treatment region is simply taken to be the sum of the outputs from each lamp. The concentration of the material in the fluid in the treatment chamber can be calculated from first order chemical kinetics (for photochemical reactions), and the parameters adjusted to minimize the concentration of reactant present at the exit region.

Lamp output power can be controlled by varying the lamp flash rate, for example manually or automatically. In one embodiment of the invention, a flow meter (not shown) is used to monitor the fluid flow rate and send a signal to a system control computer (not shown) which then varies the lamp flash rate appropriately.

Additionally, it should be noted that the design of the apparatus of the invention automatically minimizes variation in amount of light reaching different concentrations of reactant, regardless of the penetration depth of the UV light (assuming it is still significant with respect to the treatment region dimensions), even without adjusting lamp output or flow rate. All of the fluid flowing through the treatment region experiences substantially the same treatment level (UV dosage) and all photons are utilized because of the opposing light and reactant gradients.

For greater efficiency, the fluid flow should be uniform through the reactor, which can be achieved by conventional fluid flow technology known in the art. In one embodiment of the invention, improved uniformity of fluid flow can be achieved by the use of entry and exit manifolds (22) and (23), respectively, located within the entry and exit regions, or screens or porous walls (27) either located at the periphery of the baffle plates in the treatment region. The porous walls are usually ceramic and can be coated with the same kind of catalytic materials hereinafter described for coating the treatment region. The screen of porous walls form a cylinder with an axis on the center axis of the treatment region, the cylinder being of slightly smaller height than the treatment region.

Even though the invention is described for use with flash UV lamps operating at high peak power, the invention has utility with other UV arc sources where the lamp is of generally the same linear geometry and light output symmetry. When a UV flash lamp is used, operation of such a lamp with high output in the deep UV requires very high peak power and current levels, thus forcing the lamp to operate under conditions not required for normal visible light production. Accordingly, it is generally desirable to operate UV flash lamps in a so-called simmer mode, in which a small current is passed through the lamps on a continuous basis, with the simmer current and voltage being insufficient to produce the high-energy flash of light. High power for the flash is then applied as needed. When UV flash lamps are operated in the simmer mode, they typically have increased lamp life and improved efficiency of conversion of electrical energy to light energy.

Figure 2:
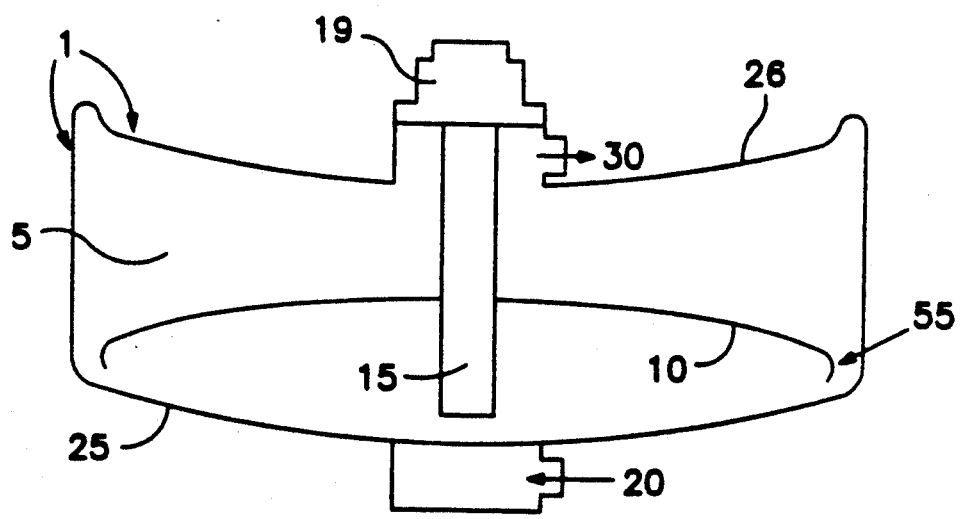
FIG. 2 is a drawing of a cross-sectional side view through the central axis of a UV radiation treatment reactor illustrating the inward dishing of the baffle plate and the ends of the treatment region.

In the first embodiment illustrated in FIG. 1, the two opposite ends (25 and 26) of the treatment region and the baffle plate (10) are all flat and have substantially parallel surfaces. In an alternate and preferred embodiment of the invention shown in FIG. 2, these surfaces are shaped so as to better tolerate internal fluid pressure and to more closely match the ideal light pattern. As shown in FIG. 2, the baffle plate (10) and the exit end (26) of the treatment region are convex when viewed from the treatment region.

In preferred embodiments, the length of the treatment region (i.e., the distance between the exit end plate of the treatment region (26) and baffle plate (10) in the region near the lamp(s) should substantially equal the length of the arc in the flash UV lamp(s), and the outer edge of the treatment region should be slightly greater in length. This not only increases the strength of the housing and treatment region structure but also makes slightly better use of photons which might otherwise strike the flat surfaces and be lost by absorption rather than be reflected back into the fluid being treated.

The embodiment shown in FIG. 1 (at least the treatment region thereof) is fabricated from conventional materials used in photochemical reactors, including aluminum, although 316L stainless steel is also preferred for some applications, such as preparing ultrapure water or treating corrosive fluid media. The treatment region walls and/or the baffle plate can be coated with a catalytic material, if desired, to increase the rate of secondary reactions that occur with reaction products produced by the initial photochemical reaction. The catalyst will vary depending on the treatment being conducted, examples of which are described in more detail below. For example, the catalyst coating can be $Fe_2O_3$, CdS, $TiO_2$, $MoO_3$, $WO_3$, $Sb_2O_3$, or any catalyst described in U.S. Pat. 4,861,484. Preferably, the catalyst is $TiO_2$ for treatment of waste water containing hydrocarbon and chlorinated hydrocarbon contaminants.

Replacement UV lamps are inserted from one end of the treatment region and penetrate baffle plate as necessary. The baffle plate may be releasably sealed (e.g., via a gasket) to the lamp housing upon insertion of a lamp to prevent untreated or treated fluid from leaking to the opposite side of the baffle plate.

A wiper brush device (21) designed to periodically clean the lamp outer enclosure of dome (18) is located outside the treatment region and can be inserted through the same fluid entry or exit region by which the fluid to be treated enters or exits. This prevents the build up of non-UV-transmitting deposits.

Figure 3:
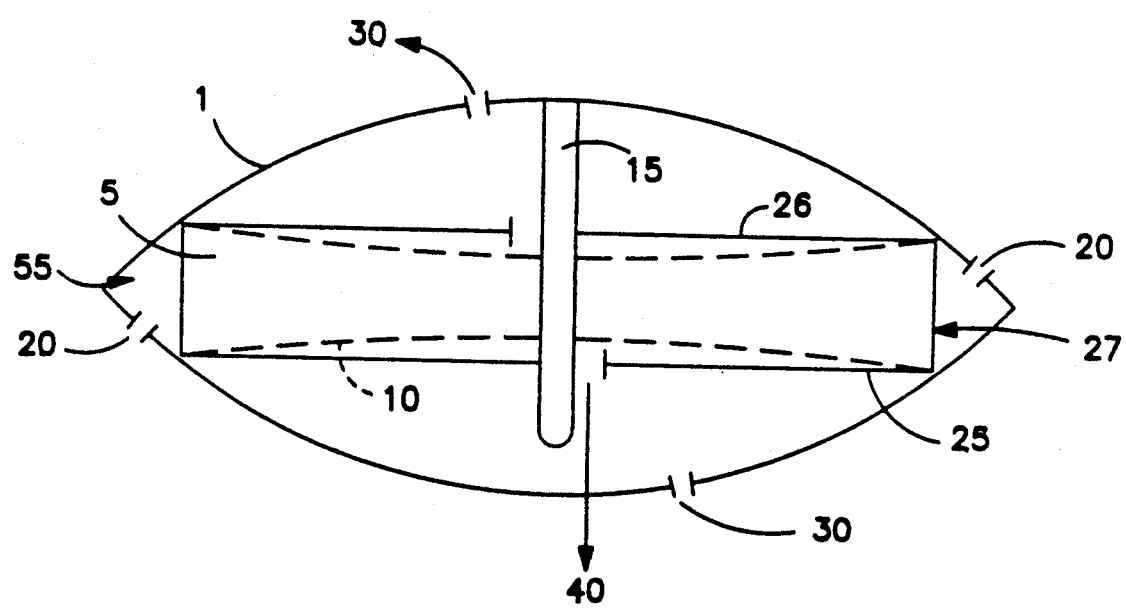
FIG. 3 is a drawing of a cross-sectional side view through the central axis of a UV radiation treatment reactor illustrating the embodiment in which the housings of the reactor and treatment regions are different and the exit regions of the treatment region are located at opposite ends of the housing.
Figure 4:
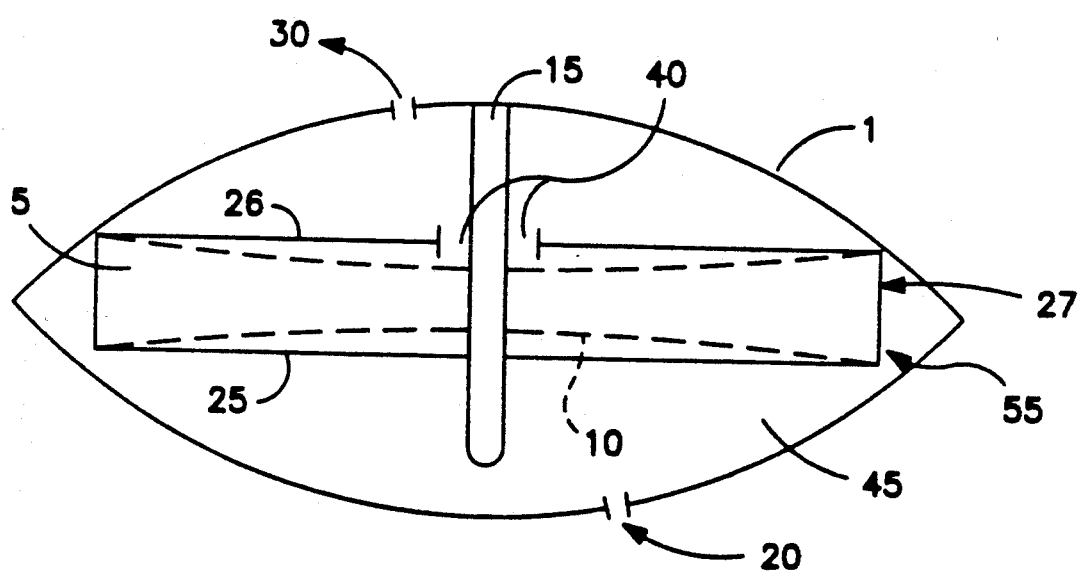
FIG. 4 is a drawing of a cross-sectional view through the central axis of a UV pressure reactor in which the housings of the reactor and treatment regions are different and the exit regions are located at one end of the treatment region opposite the entry region of the reactor.

In another embodiment, the reactor is a pressure reactor in which the entire radial flow photochemical treatment region is located within a pressure reactor housing. FIGS. 3 and 4 illustrate such reactors.

In FIG. 3, the photochemical treatment region (5) is cylindrically symmertrical around at least one line-type light source (15). The photochemical treatment region has a housing (25-26) separate from the housing (1) of the reactor. Plural entry and exit regions (20) and (30), respectively, are provided in the reactor housing (1). The pheripheral fluid entry region (55) of the treatment region preferably includes a circular porous means (27), such as a screen or porous ceramic material, which optionally with the treatment region housing and/or one or more baffle plates causes the fluid to be treated to flow into the photochemical treatment region uniformly at all points of the pheripheral cylindical surface. The fluid can be introduced at the multiple uniform points around the reactor housing to uniformly feed the fluid to the pheripheral entry region of the treatment region. The treatment region can optionally contain one or more baffle plates (10) which confine the fluid causing it to flow in a desired manner toward the light source (15). The baffle plates (10) can be flat discs in which the central hole is small compared to the outer diameter or they can be convex toward each other. The fluid exits the treatement region through the exit region (40) at either or both ends of the length of the treatment region, around the light source. As illustrated and discussed above with regard to other embodiments of the invention, the pressure reactor provides the fluid entry and exit regions, means for mounting the line-type light source and other parts, such as a lamp wiper assembly (not shown).

In another alternate embodiment shown in FIG. 4, the fluid flows only through the center exit region (40) at one end of the housing (26) of the treatment region and on out a reator exit region (30). In this case, the fluid is introduced to the pressure by the entry region (20) at the opposite end of the reactor housing from the exit region beyond the treatment region and flows through an annulus (45) in the reactor housing to reach the cylindrical pheripheral fluid entry region (55) (including the screen (27)) of the treatment region (5). In this embodiment, the annulus (45) is about ⅛ to about ½ the length of the treatment region cylinder (5).

The dimensions of the housing and the treatment region can vary as long as it is consistent with the description above. The length of the treatment region can vary but does not usually exceed about twice the length of the arc of the light source. Preferably, the ratio of the treatment region diameter to treatment region length (height) can vary but is not usually less than about the length of the treatment region for FIGS. 1 and 2 and about one and a half times the length of the treatment region for FIGS. 3 and 4. For example, the reactor embodiment shown in FIG. 1 is particularly useful for decontamination of large amounts of waste liquids, and, in this embodiment, the diameter of the treatment region is usually not less the length of the treatment region, such as from about 10 to about 60 inches, preferably from about 20 to about 55 inches and especially about 44 inches. The length (height in the orientation shown in FIG. 1) of the housing from (25) to (26) is usually from about 2 to about 15 inches, preferably from about 4 to about 8 inches and especially about 7 inches. As previously discussed, the baffle plate is of a smaller diameter than the housing. For example, when the diameter of the treatment region is about 44 inches, the baffle plate has a diameter of from about ⅛ to about 5 inches, preferably from about ¼ to about 3 inches and especially about 2 inches from the edge (35) of the treatment region. As previously discussed, the baffle plate is spaced from the the entry end of the housing and treatment region. For example, the baffle plate is spaced from about ⅛ inches to about 2 inches, preferably from about ¼ to about 2 inches from the entry end and especially from about ½ to about 1 inch from the entry end.

The reactor can be operated in any position but the preferred position is with the lamp axis in the vertical position with the treatment region above the entry region and the fluid flow upward.

The invention also relates to a method for treating a fluid with a substantially uniform dosage of UV light which comprises:

injecting a fluid into a reactor comprising a reactor housing forming an internal space comprising at least one fluid entry region, at least one fluid exit region, a central photochemical treatment region comprising a housing, a means for circumferentially distributing fluid flow radially toward and perpendicular to a line-type light source and at least one fluid exit region located on said central axis, wherein the central photochemical treatment region is rotationally symmetrical about a central axis, and at least one line-type light source located in said treatment region substantially on the central axis of said treatment region housing, the arc of said light source being oriented parallel to said central axis, and removing said UV treated fluid from said treatment region through said fluid exit.

The reactor and its treatment region are designed to be equally as useful for the treatment of photoreactive materials in the gas phase as in the liquid phase. For example, materials in the aqueous phase or in air can be used.

The fluid to be treated can be a fluid of any material susceptible to the action of UV light in a fluid phase, which fluid phase can include a solvent or carrier. Such treatment are well known in the art; for example, many kinds are disclosed in U.S. Pat. Nos. 4,609,444 and 4,81,484, the disclosures of which are incorporated by reference. As is known in the art, the solvents or carriers can be organic or inorganic liquids. The material to be treated can be any inorganic or organic material that is photoreactive. Non-limiting examples of treatments including degradation of undesirable components, such as micropollutants, halogenated hydrocarbons, hydrocarbons, including unsaturated and aromatic hydrocarbons, with or without a peroxide, such as hydrogen peroxide, or cyanides with e.g. ozone, in aqueous or organic fluid streams; photochemical reactions of reactants in chemical synthesis such as the synthesis of formaldehyde from carbon dioxide and water in the presence of metal complexes; cis-trans isomerization, for example, the conversion of the trans-isomer of stilbene to the less stable cis-isomer or the 11-cis isomer of vitamin A to the trans form; reduction reactions, for example, the reduction of quinones; oxidation reactions, for example, the oxidation of an internal olefin such as squalene; disproportionation, for example, of non-terminal ketones (Norrish reaction); addition of singlet oxygen to compounds, for example, of citronellol to produce hydroperoxides, which can be reduced to alcohols, rearranged and cyclized to rose oxide; ring-opening, for example, the ring-opening of cholesterol to give provitamin D3; polymerization of monomers for example, unsaturated monomers, such as ethylenically unsaturated monomers, chlorination, for example of propane. Coreactant materials, such as hydrogen peroxide, can be metered into the process stream at the fluid entry (20) on a volume/volume basis so as to maintain sufficient concentration of peroxide as needed to ensure quantitative light absorbtion. Co-reactant can be added before, during or after the UV treatment as appropriate to the particular reaction process. For example, a co-reactant can be added upstream of the entry region to a reactor or between sequential reactors or following photolytic treatment.

Usually the fluid to be treated will be a liquid solution, preferably an aqueous solution. The concentration of the material in the solvent or carrier can vary depending on the type of material to be treated, the solvent or carrier used, the light input and the like, and can readily be determined by those of skill in the art. By way of non-limiting example, when the material to be treated is gasoline-contaminated ground water, the light input is about 2600 watts, the solvent or carrier is water, and the concentration of the photoreactant (gasoline) in the carrier is from about 20 ppm to about 0.5 ppm, preferably from about 5 ppm to about 1 ppm.

The temperature and pressure used in the method and apparatus of the invention can vary depending upon the type of fluid introduced and the like and can readily be determined by those of skill in the art. Usually the treatment is conducted at about ambient pressure and at ambient to elevated temperatures.

The above apparatus and method of the invention have been used for the treatment of ground water contaminated with gasoline and with organic solvents, such as dichloromethane, trichloroethylene (TCE), 1,1,1-trichloroethane (TCA), dichloroethane (DCA) and the like.

The invention now being generally described, the same will be better understood by reference to the following detailed example which is provided for purposes of illustration and are not intended to be limiting to the invention.

EXPERIMENTAL

Example 1

An aqueous solution containing about 140 ppm of dichloromethane was treated with hydrogen peroxide to a concentration of about 200 ppm. The resulting aqueous admixture was charged at about ambient temperature and pressure to a reactor of the invention as described above. The treatment region of the reactor had a diameter of about 44 inches, a housing height of about 7 inches and the edge of the baffle plate was about 2 inches from the outer wall of the treatment region. The flow rate through the reactor was at a rate resulting in the exposure of the aqueous admixture to UV radiation for 2.3 minutes. The UV lamp had a pulsed power of 2700 watts and a simmer power of 330 watts. The aqueous effluent resulting from the UV treatment in the reactor had a dichloromethane concentration of 133 ppm. The first order reaction rate calculated from the above data was $-0.024$/min. The efficiency of the reaction in terms of the amount of power required to treat the dichloromethane contaminated water as expressed in terms of kJ/liter/ppm was 0.47. By contract, when conducting similar experiments using a method and reactor not of the invention, from about twice to twenty five times longer residence times were required to achieve poorer efficiencies of the order of 0.70 to 6.55 kJ/liter/ppm. Thus, results of this experiment demonstrate that the UV treatment of the invention is efficient in utilizing the UV light for carrying out photochemical reactions in a relatively short period of time.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A reactor for treatment of a fluid with a line-type light source which comprises:
   a reactor housing forming an internal space comprising at least one fluid entry region, at least one fluid exit region,
   a central photochemical treatment region comprising a housing and a means for circumferentially distributing fluid radially toward and perpendicular to a line-type light source, wherein the central photochemical treatment region is rotationally symmetrical about a central axis, and
   at least one line-type light source located in said treatment region substantially on the central axis of said treatment chamber region, the arc of said light source being oriented parallel to said central axis.

2. The reactor according to claim 1 wherein the reactor housing and the treatment region housing are the same housing.

3. The reator according to claim 1 or 2 wherein the reactor housing and the treatment region housings are different.

4. The reactor according to any one of claims 1, 2 or 3 wherein one or more baffle plates are present in the treatment region.

5. A reactor for the treatment of a fluid with a substantially uniform dosage of UV light, comprising:
   a reactor housing forming an internal space comprising a fluid entry region at one end, a central photochemical treatment region, and a fluid exit region at the opposite end, wherein said housing is rotationally symmetrical about a central axis at least in said photochemical treatment region, at least said fluid exit region being located on said central axis and being substantially narrower in diameter than said central treatment region of said housing;
   a baffle plate separating said treatment region from said fluid entry region, said baffle plate being oriented substantially orthogonal to said central axis and being of smaller diameter than said housing in said central treatment region, wherein said baffle plate and said housing are adapted to cause said fluid to flow radially inward around said baffle plate toward and perpendicular to said central axis when said fluid flows from said entry region through said treatment region to said exit region; and
   a UV arc source located in said treatment region substantially on the central axis of said housing, said arc being oriented parallel to said central axis, wherein the length of said central treatment region is substantially equal to the length of the arc.

6. The reactor according to claim 1 or 5 wherein the end of said housing surrounding said exit region and said baffle are convex as viewed from said treatment region.

7. The reactor according to claim 1 or 5 wherein at least one surface in the treatment region is coated with a catalyst.

8. The reactor according to claim 7 wherein said catalyst comprises $TiO_2$.

9. The reactor according to claim 1 or 5 wherein the diameter of said treatment region is from about 10 to about 60 inches and the length of said treatment region is from about 2 to about 15 inches.

10. The reactor according to claim 9 wherein the diameter of said treatment region is from about 20 to about 55 inches and the length of said treatment region is from about 4 to about 8 inches.

11. The reactor according to claim 1 or 5 wherein the length of the outer edge of said treatment region is greater than the arc length of said lamp at the center of said treatment region.

12. The reactor according to claim 1 or 5 further comprising means for adjusting the flow rate of the fluid.

13. The reactor according to claim 1 or 5 further comprising means for adjusting the lamp output power.

14. The reactor according to claim 13 wherein said means for adjusting the lamp output power varies said power as a function of the flow rate of the fluid.

15. The reactor according to claim 1 or 5 having a wiper brush device insertable through said fluid entry or exit region.

16. The reactor according to claim 1 or 5 having a fluid flow control device selected from (1) manifolds located in said entry and exit regions, (2) or a screen or porous wall located in said treatment region.

17. A method for treating a fluid with a substantially uniform dosage of UV light which comprises
   injecting a fluid into a reactor comprising a reactor housing forming an internal space comprising at least one fluid entry region, at least one fluid exit region, a central photochemical treatment region comprising a housing, a means for circumferentially distributing fluid flow radially toward and perpendicular to a line-type light source and at least one fluid exit region located on said central axis, wherein the central photochemical treatment region is rotationally symmetrical about a central axis, and at least one line-type light source located in said treatment region substantially on the central axis of said treatment region housing, the arc of said light source being oriented parallel to said central axis, and
   removing said UV treated fluid from said treatment region through said fluid exit.

18. The method according to claim 17 wherein the length of said treatment region is substantially equal to the length of the arc of said lamps whereby the treatment region is flooded with UV light from said arc 19. The method according to claim 17 wherein the flow rate of the fluid into the treatment region is adjusted as a function of the composition of said fluid.

20. The method according to claim 17 wherein the treatment of the fluid is oxidation.

21. The method according to claim 19 wherein the treatment is the degradation of undesirable contaminants in aqueous fluids.

22. The method according to claim 20 wherein the treatment is the degradation of halogenated hydrocarbons in aqueous fluids.

23. The method according to claim 12 wherein said treatment occurs in the presence of hydrogen peroxide.

24. The method according to claim 22 wherein said treatment is the degradation of dichloromethane.

25. The method according to claim 22 wherein the treatment is the degradation of at least one hydrocarbon selected from saturated hydrocarbons, unsaturated hydrocarbons, and aromatic hydrocarbons.

* * * * *